Aug. 25, 1964     L. R. KIMBALL     3,146,445
FEEDBACK STABILIZED SCANNING DOPPLER RADAR
Filed May 31, 1961
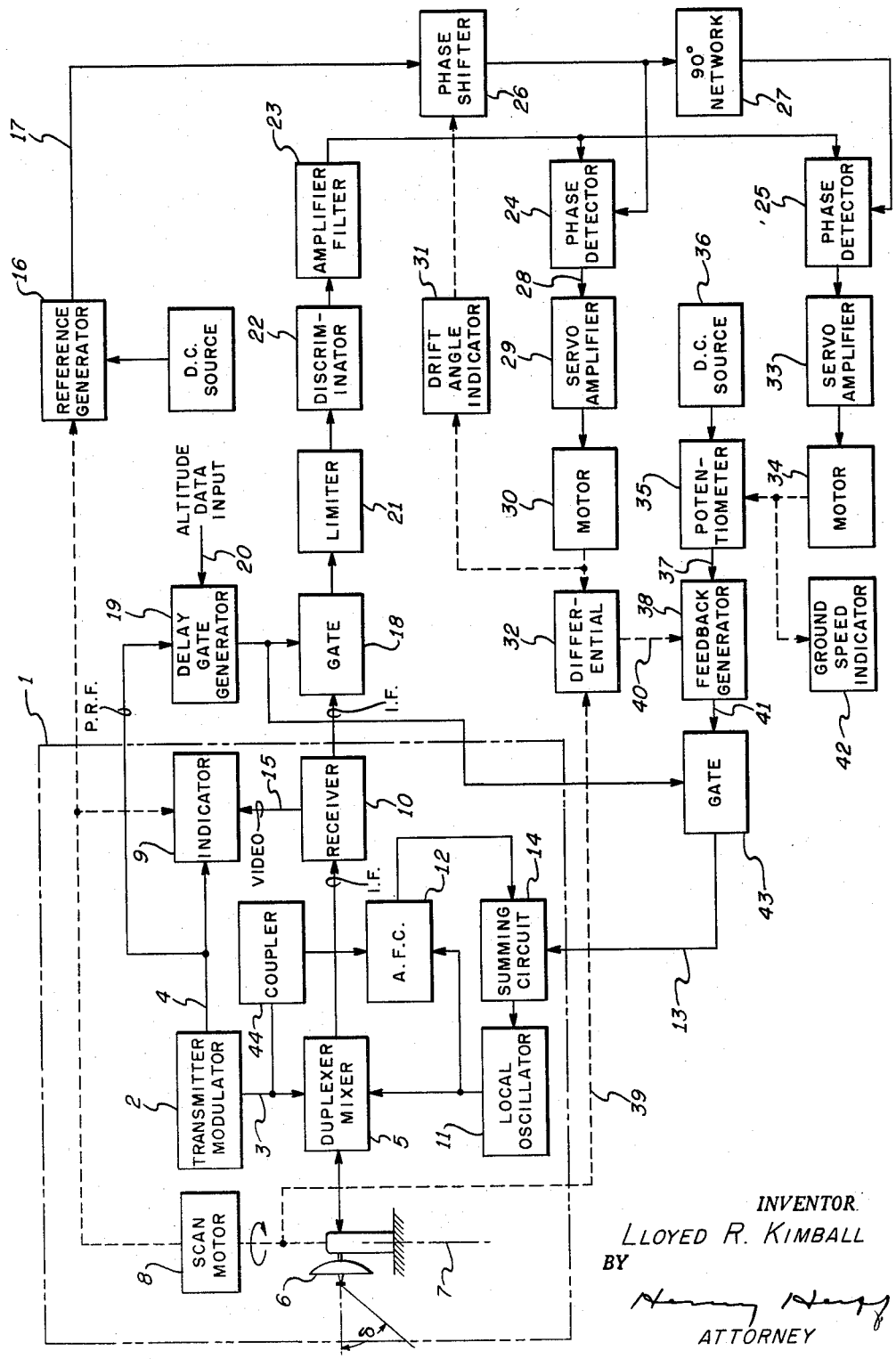
INVENTOR.
LLOYED R. KIMBALL
BY
ATTORNEY

United States Patent Office 3,146,445
Patented Aug. 25, 1964

3,146,445
FEEDBACK STABILIZED SCANNING DOPPLER RADAR
Lloyed R. Kimball, Plainview, N.Y., assignor to Sperry Rand Corporation, Great Neck, N.Y., a corporation of Delaware
Filed May 31, 1961, Ser. No. 113,688
10 Claims. (Cl. 343—9)

The present invention generally relates to a scanning radar adapted to extract target velocity data from scan modulated target echo signals and, more particularly, to feedback means for stabilizing such a radar against circuit gain and phase shift variations which tend to introduce error in the extracted data.

Prior art radars generally are adapted for the determination of either target velocity data or target position data. The usual techniques for determining target velocity do not lend themselves readily to the determination of target position and vice versa. However, both types of data are often required in a given application. For example, Doppler radar apparatus may be provided for the determination of ground speed and ground track angle for the purpose of making dead reckoning computations on the progress of an aircraft from a given starting point to a desired destination. Such dead reckoning computations are susceptible to cumulative error which increases with time because of the inability of the Doppler apparatus to provide precisely accurate ground speed and ground track angle information. Accordingly, it has been the practice to determine aircraft position by auxiliary means to correct the dead reckoning computation from time to time.

Copending patent application Serial No. 112,276, filed May 24, 1961, in the name of David Mannheimer and assigned to the present assignee, discloses airborne radar apparatus adapted for the simultaneous determination of ground speed, drift angle (ground track angle) and position. The radar is characterized by a single azimuthally scanning antenna, pulsed transmitter, and receiving means which are utilized simultaneously for the development of aircraft velocity and position data. Thus, a substantial portion of the radar apparatus is fully compatible with with the performance of both Doppler radar and search radar functions. The need for two independent Doppler and search radars for determining velocity and and position data is eliminated.

In accordance with the invention of the aforementioned patent application, the determination of ground velocity data is based upon the principle that the Doppler frequency shift of a ground target signal varies sinusoidally at the antenna rotational frequency as the antenna is scanned in azimuth. It has been found that the Doppler frequency shift of target signals returned from a finite irradiated ground area undergo coherent frequency variations due to antenna scanning. This phenomenon is exploited by the provision of a linear frequency discriminator in which the effects of frequency modulation of the Doppler signals attributable to antenna scanning are additively combined.

The discriminator produces a resultant output signal having a phase which is indicative of aircraft drift angle (angular deviation of aircraft heading from ground track) and having an amplitude indicative of aircraft ground speed (speed along said ground track). Filtering and synchronous detection means are provided to extract the drift angle and speed data from the resultant output signal. The combination of the linear discriminator and the filtering and synchronous detection means efficiently rejects frequency components which are not representative of ground velocity such as all amplitude modulated components and all frequency modulated components other than those at the antenna scanning frequency.

It will be seen that the accuracy of the aircraft drift angle and aircraft ground speed measurements is reduced by circuit variations which cause a change in the amplitude or in the phase of the discriminator output signal not attributable to changes in the received Doppler signal. For example, a change in gain or a variation in the phase shift characteristics of the receiver circuits will produce erroneous speed and drift angle indications.

It is the principal object of the present invention to improve the accuracy of the velocity data provided by a Doppler radar having a scanning antenna.

Another object is to provide means for stabilizing a scanning Doppler radar against circuit gain and phase shift variations.

An addition object is to provide feedback means for reducing the frequency variations of the Doppler shifted signals received by a radar having a continuously scanning antenna.

These and other objects of the present invention, as will appear from a reading of the following specification, are accomplished in a preferred embodiment by the provision of a scanning radar system similar to the one disclosed in the aforementioned copending application. The radar system is modified by the provision of a frequency modulated local oscillator and a signal mixer for heterodyning the received scan modulated Doppler signals with the local oscillator signal. The lower sideband signal at the output of the mixer is applied to a frequency discriminator. The local oscillator is frequency modulated by a control signal having a frequency determined by the scanning rate of the radar antenna, an amplitude proportional to aircraft ground speed and a phase representative of aircraft drift angle. The application of the control signal to the local oscillator causes the frequency of the local oscillator to vary in such a manner that the output from the signal mixer is at a substantially constant predetermined frequency irrespective of antenna scanning and aircraft velocity. Thus, the frequency variations of the signals applied to the frequency discriminator are minimized whereupon the resultant discriminator output signal reduces toward an amplitude null. The action in nulling of the discriminator output signal substantially reduces errors in the determination of aircraft velocity data attributable to circuit gain and phase shift variations.

For a more complete understanding of the present invention, reference should be had to the sole figure which is a block diagram of a preferred embodiment. An airborne azimuth scanning search radar is generally represented by the dotted block 1. The radar includes a transmitter modulator 2 which produces a pulsed microwave signal on line 3 and a series of pulse repetition rate triggers on line 4. The pulsed microwave signal is applied via duplexer 5 to antenna 6. Antenna 6 is continuously rotated about vertical axis 7 so as to cause a fan-shaped beam of microwave energy to scan in azimuth about said axis. Although the azimuth dimension of the beam preferably is narrow, the vertical dimension is sufficiently extensive to irradiate ground targets lying at the depression angle δ irrespective of the attitude of the aircraft which carries radar system 1. Antenna 6 is scanned in azimuth by motor 8. The position of the motor shaft and, hence, the azimuth position of the antenna is transmitted in conventional fashion to indicator 9 which may be of the PPI type. The shaft of motor 8 also drives reference generator 16 to produce on line 17 a sinusoidally varying signal at a frequency determined by the rotational scanning rate of antenna 6. The phase of the reference signal produced on line 17 is fixed relative to the aircraft.

Echo signals are received by antenna 6 and converted in duplexer-mixer 5 to a suitable I-F frequency for application to receiver 10. The frequency conversion is accomplished with the aid of local oscillator 11 whose frequency is determined jointly by a conventional automatic frequency control circuit 12 and by a control signal applied via line 13 and generated in a manner to be described later. In accordance with well known practice, a portion of the pulsed microwave signal on line 3 is applied by coupler 44 to A.F.C. circuit 12 which also receives the signal generated by local oscillator 11. Circuit 12 operates during the occurrence of each transmitter pulse to stabilize the frequency of oscillator 11 on a long term basis. The signal produced by automatic frequency control circuit 12 and the control signal of line 13 are additively combined in summing circuit 14 and applied to the frequency control element of local oscillator 11.

The target signals at intermediate frequency are detected within receiver 10 and applied as video signals via line 15 to indicator 9. Indicator 9 displays the received ground target signals in terms of their azimuth and range coordinates in the usual fashion.

The intermediate frequency echo signals at the output of duplexer mixer 5 are amplifier and applied by receiver 10 to a first input of electronic gate 18. Gate 18 is rendered conductive in response to a range gating signal generated by delay gate generator 19. Generator 19 produces said gating signal after a controlled delay following the occurrence of each pulse repetition rate trigger on line 4 applied to a first input of generator 19. The amount of delay introduced by generator 19 is controlled in accordance with signal data respecting aircraft altitude as applied by input line 20.

The purpose of delay gate generator 19 is to control electronic gate 18 in such a way as to maintain constant or predictable the depression angle $\delta$ irrespective of aircraft attitude. The range gating of the echo signals in electronic gate 18 obviates the necessity for providing precise antenna stabilization. The only antenna stabilization required is that to insure adequate target signal strengths under the worst conditions of aircraft attitude change that might be encountered. The effect of an antenna stabilized to maintain constant the depression angle $\delta$ is achieved merely by maintaining a fixed ratio of range gate position to aircraft altitude.

The range gated I-F signals at the output of gate 18 are applied to limiter 21 for the purpose of eliminating random signal amplitude variations which might be present. It should be noted, however, that the use of a limiter is not mandatory especially where the frequencies of the random signal amplitude variations are other than the azimuth scanning frequency of antenna 6. The amplitude limited signals at the output of limiter 21 are applied to linear frequency discriminator 22. As discussed in detail in the aforementioned copending patent application, the target echo signals received from all points within the illuminated ground target area coherently add together in discriminator 22 to produce a single resultant output signal. The resultant output signal frequency is equal to the azimuth scanning frequency of antenna 10. The amplitude of the resulant signal is a measure of aircraft ground track speed. The phase of the resultant signal, relative to the phase of the reference signal of line 17, is a measure of aircraft drift angle.

The signal at the output of discriminator 22 is applied via amplifier filter 23 jointly to the first inputs of phase detectors 24 and 25. It is preferred that the bandpass of amplifier filter 23 be adjusted to pass substantially only those signal components which are at the scanning frequency of antenna 6. The reference signal of line 17 is applied via phase shifter 26 to a second input of phase detector 24 and, via phase shifter 26 and 90° phase shift network 27, to a second input of phase detector 25.

As is well understood, phase detector 24 produces an output signal on line 28 having an amplitude related to the phase difference between the two input signals and having a polarity indicative of the sense of said difference. The output or error signal of line 28 is applied by servo amplifier 29 to drive motor 30 in a sense and by an amount determined by the polarity and amplitude of the error signal. The shaft of motor 30 simultaneously positions drift angle indicator 31 and phase shifter 26 and drives the first input of mechanical differential 32. Motor 30 adjusts the amount of phase shift introduced by phase shifter 27 in the reference signal of line 17 until the phase shifted reference signal is brought into phase quadrature with the output signal of amplifier filter 23. Under the condition of phase quadrature, the error signal disappears at the output of phase detector 24 and motor 30 is deenergized. It will be seen that the amount of phase shift introduced by phase shifter 26 is a direct measure of the relative bearing of the aircraft ground track. This follows from the facts that the peak amplitude of the sinusoidally varying signal at the output of filter 23 occurs when antenna 6 is positioned in the direction of the aircraft ground track whereas the peak amplitude of the reference signal of line 17 occurs when antenna 6 is positioned along a predetermined direction relative to the aircraft.

Inasmuch as the two input signals to phase detector 24 are brought into a phase quadrature relationship by the action of the drift angle servo loop, it can be seen that the two inputs to phase detector 25 are brought into an in-phase relationship. Consequently, the output signal of phase detector 25 is a measure of the amplitude of the output signal of filter 23. The amplitude of the output signal at filter 23, in turn, would be an accurate measure of aircraft ground speed in the event that there were no circuit gain variations present in discriminator 22 or amplifier filter 23 which would vary the amplitude of the signal at the output of filter 23 in a manner not related to aircraft velocity. Similarly, accurate data is presented by drift angle indicator 31 only in the event that there are no circuit phase shift variations present in the receiver circuits including discriminator 22 and amplifier filter 23 which would vary the phase of the output signal of filter 33 in a manner not related to aircraft ground track.

Feedback means are provided to minimize the effects of circuit gain and phase variations and to enhance the accuracy of both the ground speed and drift angle data. In accordance with this objective, the signal at the output of phase detector 25 is applied by servo amplifier 33 to motor 34. Motor 34 continues to turn so long as there is a signal at the output of phase detector 25, i.e., so long as there is a signal at the output of amplifier filter 23. The shaft of motor 34 positions the wiper of potentiometer 35, said potentiometer being excited by a direct potential produced by source 36. Thus, the potential at the wiper of potentiometer 35 (appearing on line 37) is a measure of the total angle through which the shaft of motor 34 has been turned in response to the integral of the signal derived from the output of filter 23 via phase detector 25 and amplifier 33. Said total angle is displayed by ground speed indicator 42 coupled to the shaft of motor 34.

The direct voltage on line 37 energizes electromechanical feedback generator 38. Generator 38 is driven by the output shaft of mechanical differential 32. Differential 32 is driven synchronously with the azimuthally scanning antenna 6 via a linkage 39 and, as previously described, by the output shaft of motor 30. Thus, output shaft 40 of differential 32 is driven at the same rate as input linkage 39 but with an angular phase determined by the angular displacement of the shaft of motor 30.

Feedback generator 38 may be substantially the same as the reference generator 16 except for the manner in which it is excited. Feedback generator 38 is energized by the potential applied via line 37 which potential is proportional to the integral of the signal at the output of amplifier filter 23 as previously discussed. The integral of the signal at the output of amplifier filter 23, in turn, is a measure of aircraft ground speed. Thus, the sinusoidally varying signal on line 41 at the output of feedback generator 38 has an amplitude representing aircraft ground speed, a frequency determined by the scanning rate of antenna 6 and a phase determined by the aircraft drift angle magnitude.

The sinusoidally varying signal on line 41 is applied to a first input of sampling gate 43. Sampling gate 43 is actuated synchronously with gate 18 by the range gating signal generated by delay gate generator 19. In this manner, there is produced at the output of sampling gate 43 during the occurrence of each range gating signal a short pulse having an amplitude proportional to the magnitude of the Doppler shift (ground speed) obtaining in the azimuth direction in which antenna 6 is then positioned. The pulse samples are applied via line 13 as a control signal to one of the inputs of summing circuits 14.

In a typical case, local oscillator 11 may be a klystron oscillator whose frequency is determined by the amplitude of the potential applied to its reflector electrode. The reflector electrode potential is determined jointly by the action of the conventional automatic frequency control circuit 12 and by the amplitude of the control signal which is the pulse samples applied by line 13. Local oscillator 11 is responsive to the amplitude of the control signal pulses in a sense so that the frequency of oscillator 11 is abruptly changed during each control signal pulse to oppose changes in frequency at the output of mixer 5 attributable to Doppler shift. It should be noted that A.F.C. circuit 12 produces no output to interfere with the control action of the pulses on line 13 because circuit 12 is operative only during and not between the occurrences of the transmitter pulses.

It can be seen that the action of the ground speed feedback loop including servo amplifier 33, motor 34, potentiometer 35, D.C. source 36, feedback generator 38, sampling gate 43 and summing circuit 14 is to oppose all frequency modulation of the received echo signals attributable to aircraft velocity and the scanning motion of antenna 6. The result is that the frequency of the signal at the output of mixer 5 is maintained at IF-frequency and the amplitude of the signal at the output of discriminator 22 is reduced toward a null whereby the effects of gain and phase shift variations in the signal data handling circuits are substantially eliminated. Concomitant with the reduction of such effects, the accuracy of the ground speed and drift angle data as indicated by ground speed indicator 42 and drift angle indicator 31 is enhanced.

It should be observed that although it is preferred in the disclosed embodiment to utilize the local oscillator 11 and mixer 5 of the radar 1 also as part of the apparatus for producing a signal null at the output of discriminator 22, a separate oscillator and mixer may be provided for the last-named purpose. The separate oscillator and mixer may be introduced into the Doppler signal path anywhere ahead of the input to discriminator 22.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Feedback stabilized Doppler apparatus comprising means for irradiating a target object with a scannable beam of microwave energy, means for scanning said beam and for generating a variable amplitude feedback signal having a frequency equal to the scanning frequency of said beam, means for receiving echo signals from said target object, said echo signals being frequency modulated at said scanning frequency, said means for receiving including a controllable frequency local oscillator and a signal mixer for heterodyning the received echo signals with the local oscillator signal to produce an output signal, frequency discriminating means coupled to receive said output signal for producing a control signal representing the departure of said output signal from a predetermined frequency, means for applying said control signal to said means for generating said feedback signal to vary the amplitude of said feedback signal in accordance with said control signal, and means for applying said feedback signal to said local oscillator for controlling the frequency thereof.

2. Feedback stabilized Doppler apparatus comprising means for irradiating a target object with a scannable beam of microwave energy, means for scanning said beam and for generating a variable amplitude feedback signal having a frequency equal to the scanning frequency of said beam, means for receiving echo signals from said target object, said echo signals being frequency modulated at said scanning frequency, said means for receiving including a controllable frequency local oscillator and a signal mixer for heterodyning the received echo signals with the local oscillator signal to produce an output signal, frequency discriminating means coupled to receive said output signal for producing a control signal representing the departure of said output signal from a predetermined frequency, means for integrating said control signal, and for applying the integrated control signal to said means for generating said feedback signal to vary the amplitude of said feedback signal in accordance with said integrated control signal, and means for applying said feedback signal to said local oscillator for controlling the frequency thereof.

3. Doppler apparatus comprising means for irradiating a target object wtih a scannable beam of microwave energy, means for scanning said beam and for generating a variable amplitude alternating signal having a frequency equal to the scanning frequency of said beam, means for receiving echo signals from said target object, said echo signals being frequency modulated at said scanning frequency, said means for receiving including a controllable frequency local oscillator and a signal mixer for heterodyning the received echo signals with the local oscillator signal to produce an output signal, demodulating means including frequency discriminating means coupled to receive said output signal for producing a control signal representing the departure of said output signal from a predetermined frequency, means for integrating said control signal and for applying the integrated control signal to said means for generating said alternating signal to vary the amplitude of said alternating signal in accordance with said integrated control signal, and means for applying said alternating signal to said local oscillator for controlling the frequency therof.

4. Apparatus for indicating the speed of a target object comprising means for irradiating said target object with a scannable beam of microwave energy, means for scanning said beam and for generating a variable amplitude feedback signal having a frequency equal to the scanning frequency of said beam, means for receiving echo signals from said target object, said echo signals being frequency modulated at said scanning frequency, said means for receiving including a a controllable frequency local oscillator and a signal mixer for heterodyning the received echo signals with the local oscillator signal to produce an output signal, demodulating means including frequency discriminating means coupled to receive said output signal for producing a control signal representing the departure of said output signal from a predetermined frequency, means for integrating said control signal and for applying the integrated control signal to said means for generating said feedback signal to vary the amplitude of said feedback signal in accordance with said integrated control signal, means for applying said feedback signal to said local oscillator for controlling the frequency thereof, and means for indicating the amplitude of said integrated control signal.

5. Airborne Doppler radar apparatus comprising means for irradiating ground target objects with a scanable beam of microwave energy, means for scanning said beam about a vertical axis and for generating a variable amplitude feedback signal having a frequency equal to the scanning frequency of said beam, means for receiving echo signals from said target objects, said echo signals being frequency modulated at said scanning frequency, said means for receiving including a controllable frequency local oscillator and a signal mixer for heterodyning the received echo signals with the local oscillator signal to produce an output signal, frequency discriminating means connected to receive said output signal for producing a control signal representing the departure of said output signal from a predetermined frequency, means for applying said control signal to said means for generating said feedback signal to vary the amplitude of said feedback signal in accordance with said control signal, and means for applying said feedback signal to said local oscillator for varying the frequency thereof.

6. Airborne Doppler radar apparatus comprising means for irradiating ground target objects with a scannable beam of microwave energy, means for scanning said beam about a vertical axis and for generating a variable amplitude feedback signal having a frequency equal to the scanning frequency of said beam, means for receiving echo signals from said target objects, said echo signals being frequency modulated at said scanning frequency, said means for receiving including a controllable frequency local oscillator and a signal mixer for heterodyning the received echo signals with the local oscillator signal to produce an output signal, demodulating means including a frequency discriminator connected to receive said output signal for producing a control signal representing the departure of said output signal from a predetermined frequency, means for integrating said control signal and for applying the integrated control signal to said means for generating said feedback signal to vary the amplitude of said feedback signal in accordance with said integrated control signal, and means for applying said feedback signal to said local oscillator for varying the frequency thereof.

7. Apparatus for indicating the ground speed of an aircraft comprising means for irradiating ground target objects with a scannable beam of microwave energy, means for scanning said beam about a vertical axis and for generating a variable amplitude feedback signal having frequency equal to the scanning frequency of said beam, means for receiving echo signals from said target objects, said echo signals being frequency modulated at said scanning frequency, said means for receiving including a controllable frequency local oscillator and a signal mixer for heterodyning the received echo signals with the local oscillator signal to produce an output signal, demodulating means including a frequency discriminator connected to receive said output signal for producing a control signal representing the departure of said output signal from a predetermined frequency, means for integrating said control signal and for applying the integrated control signal to said means for generating said feedback signal to vary the amplitude of said feedback signal in accordance with said integrated control signal, means for applying said feedback signal to said local oscillator for varying the frequency thereof, and means for indicating the amplitude of said integrated control signal.

8. Feedback stabilized airborne Doppler apparatus comprising means for irradiating ground target objects with a scannable beam of pulsed microwave energy, means for scanning said beam about a vertical axis and for generating a variable amplitude feedback signal having a frequency equal to the scanning frequency of said beam, means for selectively receiving echo signals from those of said target objects which are at a predetermined range from said radar, said echo signals being frequency modulated at said scanning frequency, said means for selectively receiving including a controllable frequency local oscillator and a signal mixer for heterodyning the received echo signals with the local oscillator signal to produce a first output signal, frequency discriminating means coupled to receive said first output signal for producing a second output signal having an amplitude representing the departure of said first output signal from a predetermined frequency, means for applying said second output signal to said means for generating said feedback signal to vary the amplitude of said feedback signal in accordance with the amplitude of said second output signal, and means for applying said feedback signal to said local oscillator for controlling the frequency thereof.

9. Feedback stabilized Doppler apparatus comprising means for irradiating a target object with a scannable beam of microwave energy, means for scanning said beam and for generating a reference signal of fixed amplitude and phase and a feedback signal of variable amplitude and variable phase, both said reference and feedback signals having a frequency equal to the scanning frequency of said beam, means for receiving echo signals from said target object, said echo signals being frequency modulated at said scanning frequency, said means for receiving including a controllable frequency and controllable phase local oscillator and a signal mixer for heterodyning the received modulated signal with the local oscillator signal to produce an output signal, a frequency discriminator coupled to receive said output signal, phase comparing means having two inputs, one of said inputs being connected to the output of said discriminator and the other of said inputs being coupled to receive said reference signal, said phase comparing means producing a first control signal representing the direction of the radial velocity of said target object relative to said Doppler apparatus, signal amplitude measuring means coupled to the output of said discriminator for producing a second control signal representing the magnitude of said radial velocity, means for applying said first and second control signals to said means for generating said feedback signal to respectively vary the phase and the amplitude of said feedback signal in accordance therewith, and means for applying said feedback signal to said local oscillator for controlling the frequency thereof.

10. Apparatus as defined in claim 9 and further including means for indicating the magnitude of said first and second control signals.

References Cited in the file of this patent

UNITED STATES PATENTS

| | | |
|---|---|---|
| 2,853,700 | Cherry | Sept. 23, 1958 |
| 2,871,468 | Smith | Jan. 27, 1959 |
| 2,891,245 | Coogan | June 16, 1959 |
| 2,896,074 | Newsom | July 21, 1959 |